US009569452B1

(12) United States Patent
Mikula

(10) Patent No.: US 9,569,452 B1
(45) Date of Patent: Feb. 14, 2017

(54) EXPONENTIAL DECAY SET PRUNING

(75) Inventor: John C. Mikula, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 428 days.

(21) Appl. No.: 13/611,475

(22) Filed: Sep. 12, 2012

(51) Int. Cl.
*G06F 17/30* (2006.01)
*G06F 3/06* (2006.01)

(52) U.S. Cl.
CPC ....... *G06F 17/30147* (2013.01); *G06F 3/0649* (2013.01); *G06F 3/0652* (2013.01)

(58) Field of Classification Search
CPC . G06F 3/0649; G06F 3/0652; G06F 17/30147
See application file for complete search history.

(56) References Cited

U.S. PATENT DOCUMENTS

| 8,006,111 | B1 * | 8/2011 | Faibish et al. | 713/324 |
| 8,255,660 | B1 * | 8/2012 | Chatterjee et al. | 711/170 |
| 2004/0044844 | A1 * | 3/2004 | Gibble et al. | 711/112 |
| 2013/0290598 | A1 * | 10/2013 | Fiske et al. | 711/103 |
| 2014/0223107 | A1 * | 8/2014 | Sadok et al. | 711/136 |

OTHER PUBLICATIONS

Spinellis, Diomidis D., "Organized pruning of file sets" in ;login: The Magazine of Usenix & Sage. Jun. 2003, vol. 28, No. 3, p. 39-42.*
John Gilmore and Jay Fenlason et al. GNU tar: an archiver tool. Free Software Foundation, Inc. 2013.*

* cited by examiner

*Primary Examiner* — Sherief Badawi
*Assistant Examiner* — Jesse P Frumkin
(74) *Attorney, Agent, or Firm* — Thomas | Horstemeyer LLP

(57) ABSTRACT

Disclosed are various embodiments for applying a pruning to data sets, files, logs, and/or any other information. A binning methodology may be employed to determine which data to retain or discard to determine a resulting set of data resembling an exponential decay where more recent items of data are more likely to be retained and more archaic items of data are more likely to be discarded. The resulting set of data may be associated with an average age.

23 Claims, 7 Drawing Sheets

US 9,569,452 B1

EXPONENTIAL DECAY SET PRUNING

BACKGROUND

Digital backups may create exact and/or compressed digital replicas of thousands of data items until all available space has been used or until all data items have been stored. Accordingly, backups of continuously growing sets of data, logs, and/or files may retain obsolete data causing an inefficient use of resources.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to employing data retention policies by pruning data sets to obtain a resulting set of data with timestamps resembling an exponential decay. When backups are created, every item of data analyzed during the backup may be compressed and/or saved. This may repeat until all data items have been saved or until all available resources have been exhausted, such as a network drive running out of storage space. Yet, many of the more archaic data items have a small likelihood of being accessed in the future. Accordingly, it may be desirable to employ backup retention policies that make recently saved and/or accessed data items more likely to be retained while discarding more archaic data items. A data pruning system employing policies that make a resulting set of data resemble an exponential decay may be used to increase the probability of retaining recent data items while increasing the probability of older data items being discarded. In the following discussion, a general description of the system and its components is provided, followed by a discussion of the operation of the same.

Figure 1:
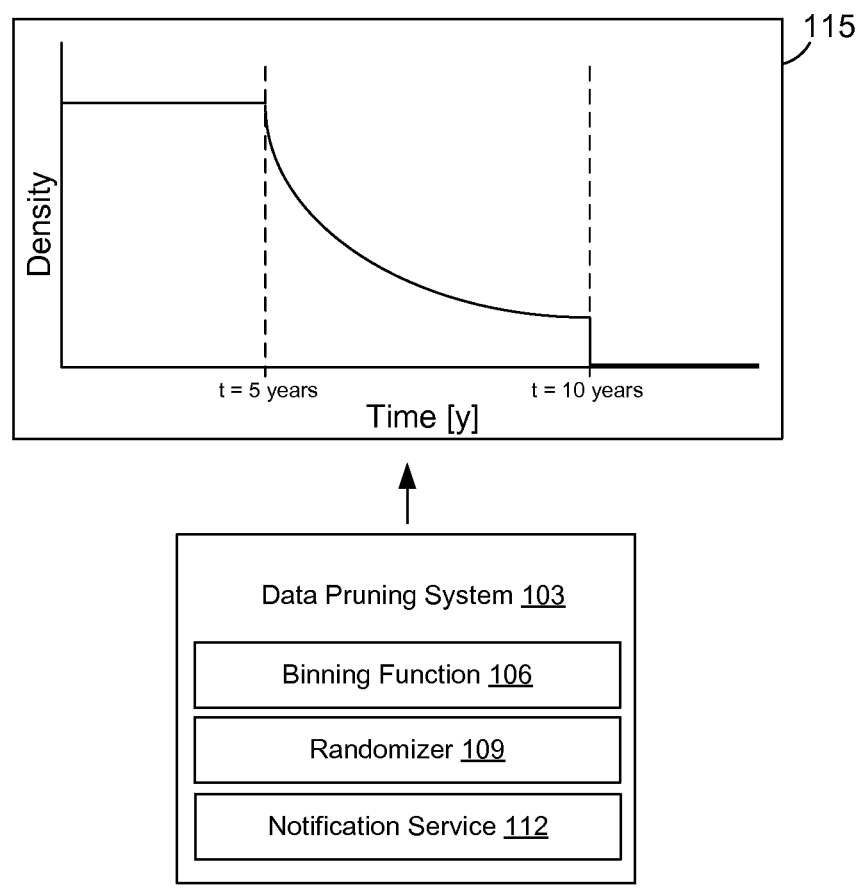
FIG. 1 is a drawing of a chart generated by a data pruning system according to various embodiments of the present disclosure.

With reference to FIG. 1, shown is a data pruning system 103 comprising a binning function 106, a randomizer 109, and a notification service 112. The data pruning system 103 may be employed to apply pruning to data items such as data sets, files, logs, data segments, data portions, and/or data in any other form. A timestamp associated with the plurality of data items may be used in determining which data items to prune. For example, the data pruning system 103 may prune data items according to an age of each of the data items based at least in part on the timestamp. Alternatively, other data associated with a data item may be used in determining which data items to prune such as the file name, file extension, file size, file type, and/or any other data associated with the data item. The data pruning system 103 may generate a chart 115, one or more histograms, or other pictorial representations indicating a forecast and/or results associated with a pruning as will be discussed below.

Next a discussion of the computing environment is provided in which the user interface is generated followed by a discussion of the operation of the same.

Figure 2:
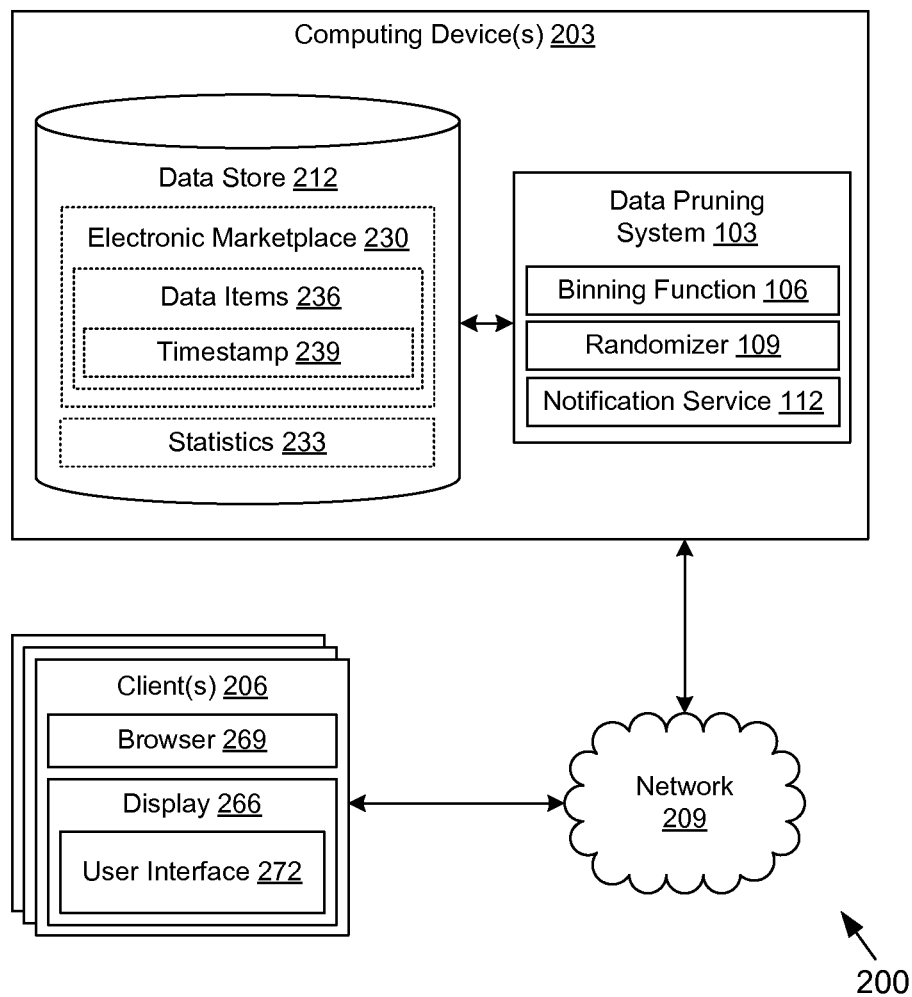
FIG. 2 is a drawing of a networked environment employing use of the data pruning system of FIG. 1 according to various embodiments of the present disclosure.

With reference to FIG. 2, shown is a networked environment 200 according to various embodiments. The networked environment 200 includes a computing device 203 in data communication via a network 209. The network 209 includes, for example, the Internet, intranets, extranets, wide area networks (WANs), local area networks (LANs), wired networks, wireless networks, or other suitable networks, etc., or any combination of two or more such networks.

The computing device 203 may comprise, for example, a server computer or any other system providing computing capability. Alternatively, the computing device 203 may employ a plurality of computing devices that may be employed that are arranged, for example, in one or more server banks or computer banks or other arrangements. Such computing devices may be located in a single installation or may be distributed among many different geographical locations. For example, the computing device 203 may include a plurality of computing devices that together may comprise a cloud computing resource, a grid computing resource, and/or any other distributed computing arrangement. In some cases, the computing device 203 may correspond to an elastic computing resource where the allotted capacity of processing, network, storage, or other computing-related resources may vary over time.

Various applications and/or other functionality may be executed in the computing device 203 according to various embodiments. Also, various data is stored in a data store 212 that is accessible to the computing device 203. The data store 212 may be representative of a plurality of data stores 212 as can be appreciated. The data stored in the data store 212 for example, is associated with the operation of the various applications and/or functional entities described below.

The components executed on the computing device 203, for example, include a data pruning system 103, and other applications, services, processes, systems, engines, or functionality not discussed in detail herein. The data pruning system 103 is executed to apply a pruning to a plurality of data items such as sets of data, files, logs, data segments, data portions, and/or any other information. The data pruning system 103 may retrieve, access, and/or receive data items 236 to be pruned. Some of the data items 236 retrieved and/or received may not be subject to the pruning. Accordingly, the data pruning system 103 may remove data items 236 from the data set subject to the pruning so that the data items 236 removed may be retained and/or discarded. For example, all data items 236 younger than a certain age may be automatically retained while data items 236 older than a certain age may be automatically discarded. The pruning system 103 may employ a binning function 106 to map a plurality of data items 236 of a variable size to smaller sets of a fixed size. It may be desired to employ an idempotent pruning to the data items 236 in order to accurately forecast which data items 236 will be subject to a pruning. Alternatively, a randomizer 109 may be used to randomize the logic of which data items 236 are subject to the pruning, as may be appreciated. A notification service 112 may be used to transmit notifications comprising forecasts, statistics, generated histograms and/or results associated with a pruning to another system and/or device via SMS, push notifications, e-mail, instant message, facsimile, and/or any other form of electronic communication.

The data stored in the data store 212 includes, for example, data associated with an electronic marketplace 230, statistics 233, and potentially other data. Data items 236 may be associated with a binary file, log, data set, and/or any other collection of digital items capable of association with a timestamp 239. A timestamp 239 may be in association with a time data items 236 was modified, created, and/or any other alteration to data items 236. Data associated with statistics 233 may be data compiled during a pruning, data forecasting a pruning, the number of pruning iterations, generated histograms comprising information associated with the pruning, and/or any other statistical information associated with a pruning.

The client 206 is representative of a plurality of client devices that may be coupled to the network 209. The client 206 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 206 may include a display 266. The display 266 may comprise, for example, one or more devices such as liquid crystal display (LCD) displays, gas plasma-based flat panel displays, organic light emitting diode (OLED) displays, LCD projectors, or other types of display devices, etc.

The client 206 may be configured to execute various applications such as a client application and/or other applications. The client application may be executed in a client 206, for example, to access network content served up by the computing device 203 and/or other servers, thereby rendering a user interface 272 on the display 266. The client application may, for example, correspond to a browser 269, a mobile application, etc., and the user interface 272 may correspond to a network page, a mobile application screen, etc. The client 206 may be configured to execute applications beyond the client application such as, for example, browsers, mobile applications, email applications, social networking applications, and/or other applications.

Next, a general description of the operation of the various components of the networked environment 200 is provided. To begin, a plurality of data items 236 are retrieved and/or received by the data pruning system 103. For example, data items 236 stored on a network drive may be received by the data pruning system 103 to generate a backup of the network drive. It is understood that each data item 236 may be associated with a timestamp 239 indicating a time of creation and/or modification of the data item 236. The data pruning system 103 may remove any data item 236 that should not be subject to the pruning. For example, a system administrator may have previously indicated that data items 236 younger than a certain age are to be automatically retained and data items 236 older than a certain age years are to be automatically discarded. The data pruning system 103 may do so prior to initiating a pruning.

The data pruning system 103 may employ policies to determine which data items 236 to retain or discard based at least in part of an average age and/or available resources. The data pruning system 103 may apply a binning function capable of binning large sets of data items 236 with a variable length to potentially smaller data sets of fixed lengths, as will be discussed below. After a pruning via data pruning system 103, statistics and/or results compiled during the pruning may be returned to a user and/or generated in a chart 115 (FIG. 1). Similarly, a histogram may be generated comprising the results of the pruning. For example, the histogram may comprise average of the results, the number of samples at a specific age, and/or any other information. Notifications comprising the statistics, results, and/or histograms may be transmitted to, for example, a system administrator comprising the statistics and/or results.

Figure 3A:
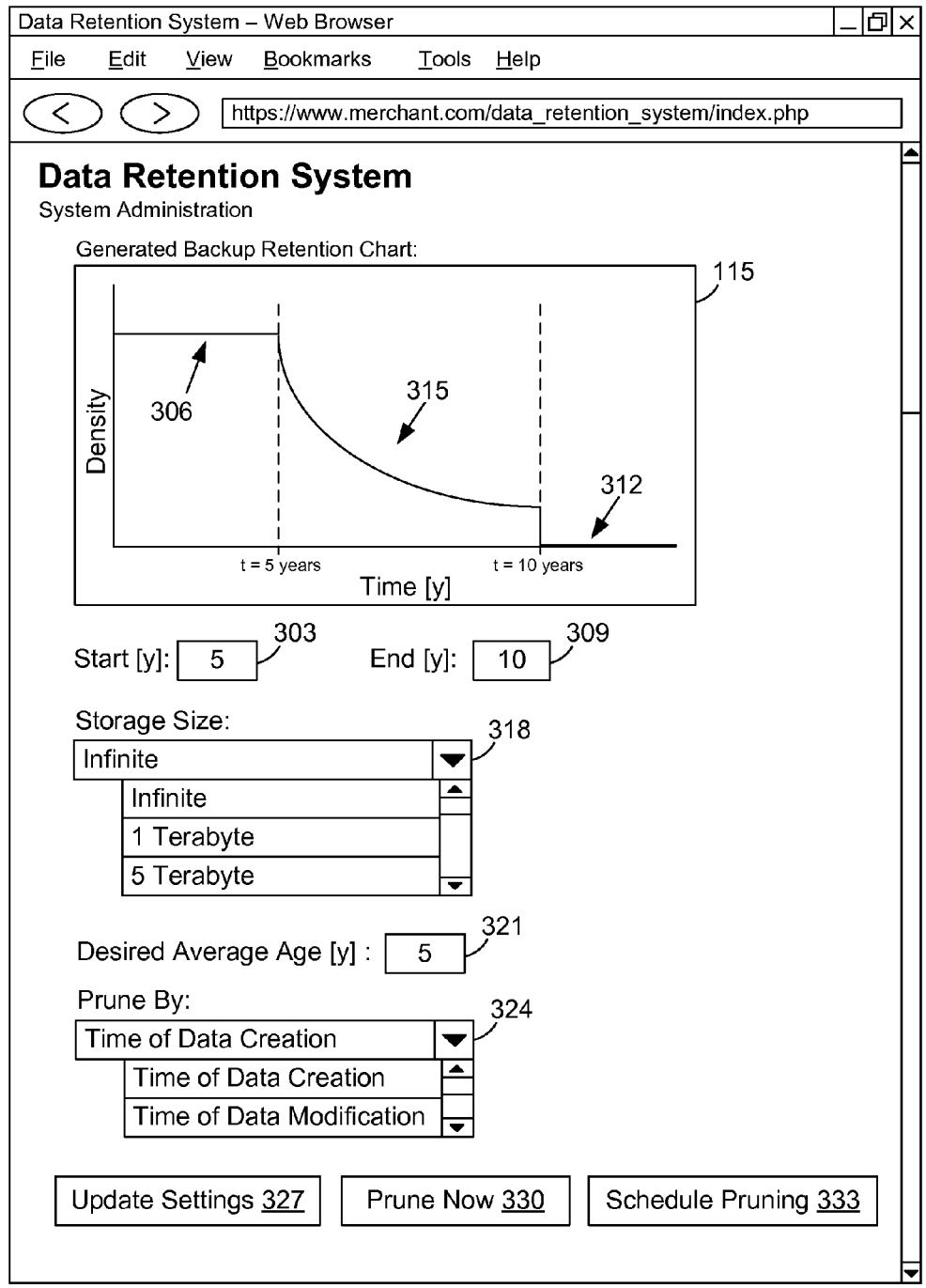
FIGS. 3A-B are drawings of examples of user interfaces rendered by a client in the networked environment of FIG. 2 according to various embodiments of the present disclosure.
Figure 3B:
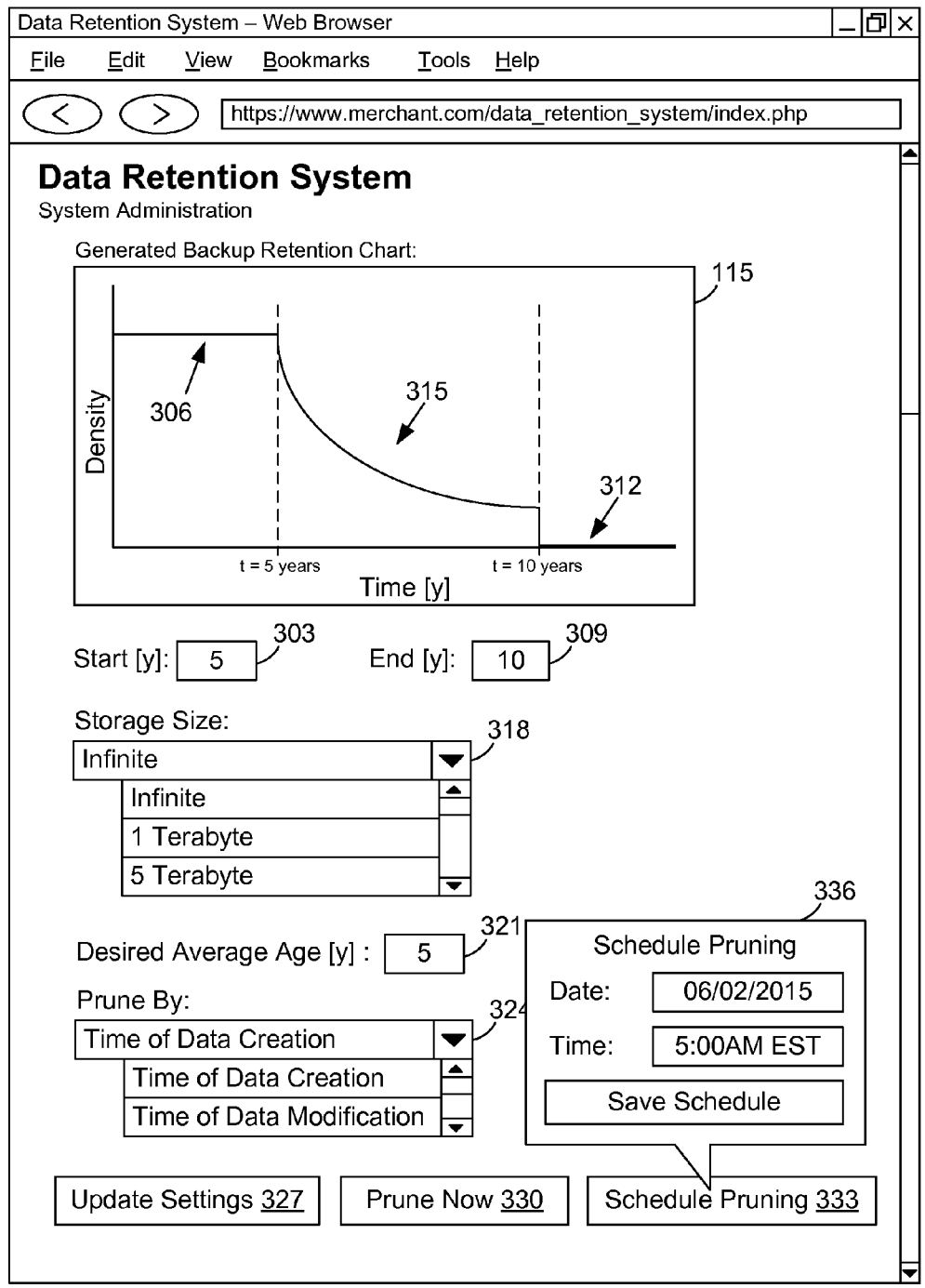

Referring next to FIGS. 3A-B, shown are examples of user interfaces 272 (FIG. 2) rendered in a browser 269 (FIG. 2) on a client 206 (FIG. 2). Specifically, the user interface 272 facilitates the pruning of data items 236 (FIG. 2) via data pruning system 103 (FIG. 1). A data retention chart 115 may be generated according to the data provided by, for example, a system administrator in the fields below the data retention chart 115. For example, the start time 303 of 5 years is shown as the time elapsed 306 on chart 115 between 0 and 5 years. Similarly, the end time 309 is shown as the time elapsed 312 on chart 115 from 10 years to time infinity. The intermediate time elapsed 315, shown in FIGS. 3A-3B as the time between 5 years and 10 years, depicts the data items 236 subject to the pruning forecasted as an exponential decay. As depicted in the intermediate time elapsed 315, it is understood that the data items 236 associated with more recent timestamps 239 (FIG. 2) are more likely to be retained as opposed to data items 236 associated with more archaic timestamps 239. It is further understood that the data items 236 associated with timestamps 239 depicted outside the intermediate time elapsed 315 are not subject to the impending pruning. Rather, the data items 236 associated with timestamps 239 outside the intermediate time elapsed 315 may be retained and/or discarded from the backup as may be appreciated.

A storage size 318 may be used by data pruning system 103 in determination of which data items 236 to retain or discard. For example, if a limited number of resources are available, the data pruning system 103 may apply a more substantial pruning in order to have a resulting set fall within the resources. A more substantial pruning may include discarding more data items 236, as may be appreciated. Similarly, if large or infinite resources are available, a liberal pruning may be applied discarding fewer data items 236. An average age 321 defined by a user may be used by data pruning system 103. It is understood that data items 236 above an average age 321 are more likely to be retained and data items 236 below the average age 321 are more likely to be discarded.

The timestamp 239, used by data pruning system 103, may be associated with a timestamp 239 indicating a time a data item 236 was created and/or modified as shown in combination box 324. The settings provided by a user in the fields of FIGS. 3A-B may be saved in, for example, data store 212 (FIG. 2) and utilized in future prunings upon an engagement of button 327. Button 330 may permit a user to initiate a pruning by data pruning system 103. In other embodiments, the pruning may be initiated by the creation and/or modification of one or more data items 236. For example, upon creating the millionth file on a network drive, the data pruning system 103 may initiate a new backup and pruning of all files on a network drive. In another embodiment, the initiation of a pruning may be determined by a file system. Similarly, a pruning may be scheduled in the future via button 333. For example a dialog 336 may initiate a progression of user interfaces 272 to permit a user to input a time to schedule a pruning using the instant settings as may be appreciated.

Figure 4:
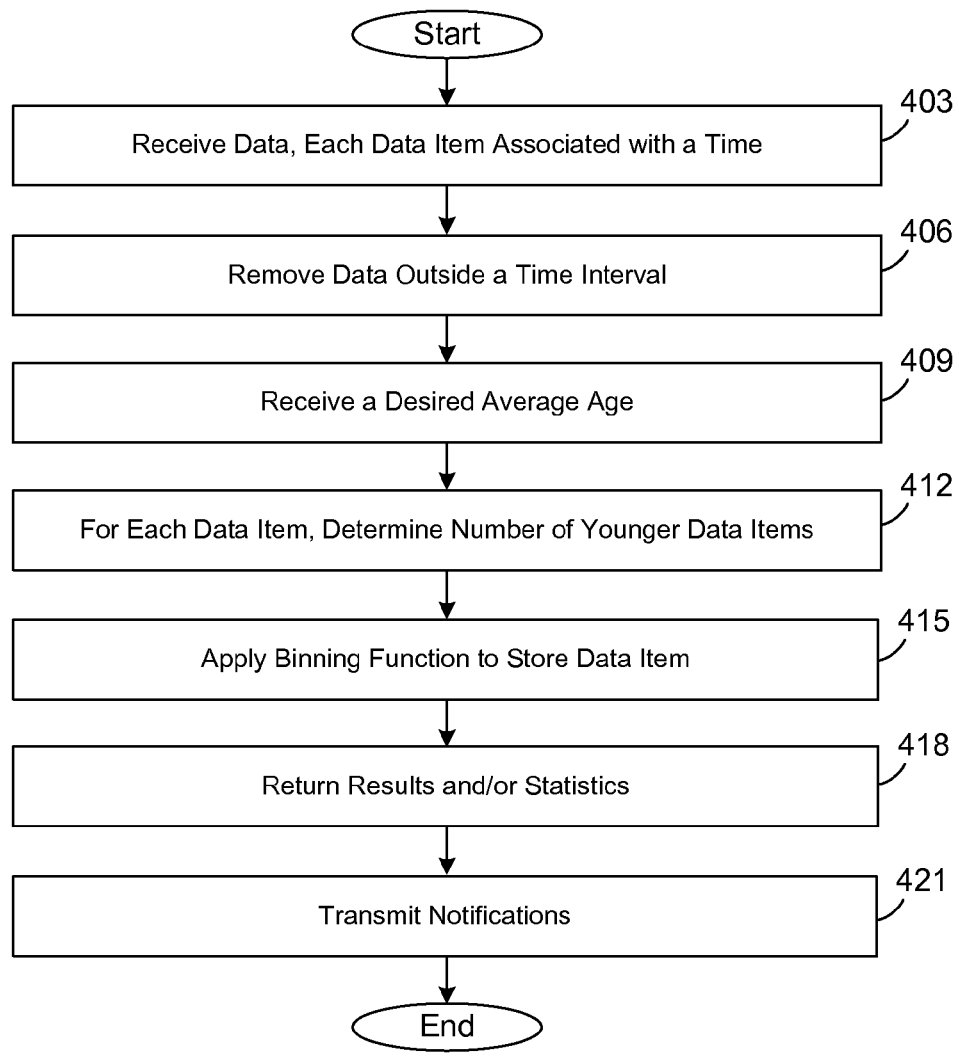
FIG. 4 is a flowchart illustrating one example of functionality implemented as portions of the data pruning application of FIG. 1 executed in a computing environment in the networked environment of FIG. 2 according to various embodiments of the present disclosure.

Moving on to FIG. 4, shown is a flowchart that provides one example of the operation of a portion of the data pruning system 103 according to various embodiments. It is understood that the flowchart of FIG. 4 provides merely an example of the many different types of functional arrangements that may be employed to implement the operation of the portion of the data pruning system 103 as described herein. As an alternative, the flowchart of FIG. 4 may be viewed as depicting an example of steps of a method implemented in the computing device 203 (FIG. 2) according to one or more embodiments.

Beginning with box 403, data items 236 (FIG. 2) are received and/or accessed in order to initiate a pruning. It is understood that one or more timestamps 239 (FIG. 2) are typically associated with data items 236. The timestamps 239 may reflect, for example, a precise time reflecting when a data item 236 was created and/or modified. In box 406, data items 236 associated with a timestamp 239 not situated during a predefined time interval may be removed. For example, the user interfaces 272 of FIGS. 3A-B permit a user to provide a start date 303 (FIG. 3) and an end date 309 (FIG. 3). Data items 236 associated with a timestamp before the start date 303 and data items 236 associated with a timestamp 239 after the end date 309 may be removed from the set, and thus will not be subject to the pruning. It is understood that the data items 236 not subject to the pruning may be automatically retained or discarded. Alternatively, a different pruning may be applied to the data items 236 not subject to an instant pruning.

The initiation of the pruning may be initiated by one or more creations, saves and/or modifications of data items 236; a condition detected by a file system; a request made by a user; the completion of a previous pruning; and/or a previously scheduled time of pruning.

In box 409, a desired average age 321 (FIGS. 3A-B) of the resulting set of data items 236 may be received. For example, the user interface 272 (FIG. 2) in FIG. 3A prompts the user to provide a desired average age 321 of the resulting set of the data items 236. It is understood that the average age 321 may be used in determining which data items 236 to retain and which data items 236 to prune.

In box 412, the number of data items 236 younger than each data item 236 is determined. For example, a given data item 236 may have a number of data items 236 both younger and older than the given data item 236. A younger data item 236 may be created and/or modified more recently than an older data item 236. The number of data items 236 younger than a given data item 236 may provide an approximation on where a data item 236 resides with respect to the average age 321 received in box 409. The number of data items 236 younger than data item 236 may be determined by doing a comparison of the timestamp 239 associated with the data item 236 with the timestamp 239 of each and every other data item 236. Alternatively, the number of data items 236 younger than a given data item 236 may be represented as a function of time:

$$N(t) = \int_0^\tau \rho_0 e^{-\lambda t} = \frac{\rho_0}{\lambda}(1 - e^{-\lambda t}), \qquad (1)$$

wherein time is represented as t, the desired average age 321 of the data items 236 may be represented as $$\frac{1}{\lambda},$$

and the initial sample density may be represented as $\rho_0$.

In box 415, the number of data items 236 younger than a given data item 236 may be used in applying a binning function to the data items 236. For example, if there are five data items 236 younger than a given data item 236, the given data item 236 may be placed in a bin with an index of five. Similarly, the next youngest data item 236 may be placed in bin four and so forth. The size of a data item 236 may be further used in the determination of whether or not to place a data item 236 in a specified bin. Determining the placement of a bin as well as potential collisions are addressed in further detail below with respect to FIG. 5. In box 418, the results and/or statistics associated with the pruning may be returned to requesting client 206 (FIG. 2). Results and/or statistics may include the number of data items 236 pruned, the number of data items 236 saved and/or retained, and/or any other statistical information.

In box 421, notifications associated with the pruning may be transmitted to requesting devices. For example, a system administrator may be notified upon the initiation and/or completion of a pruning. The notification may comprise the results and/or statistics associated with the pruning.

Figure 5:
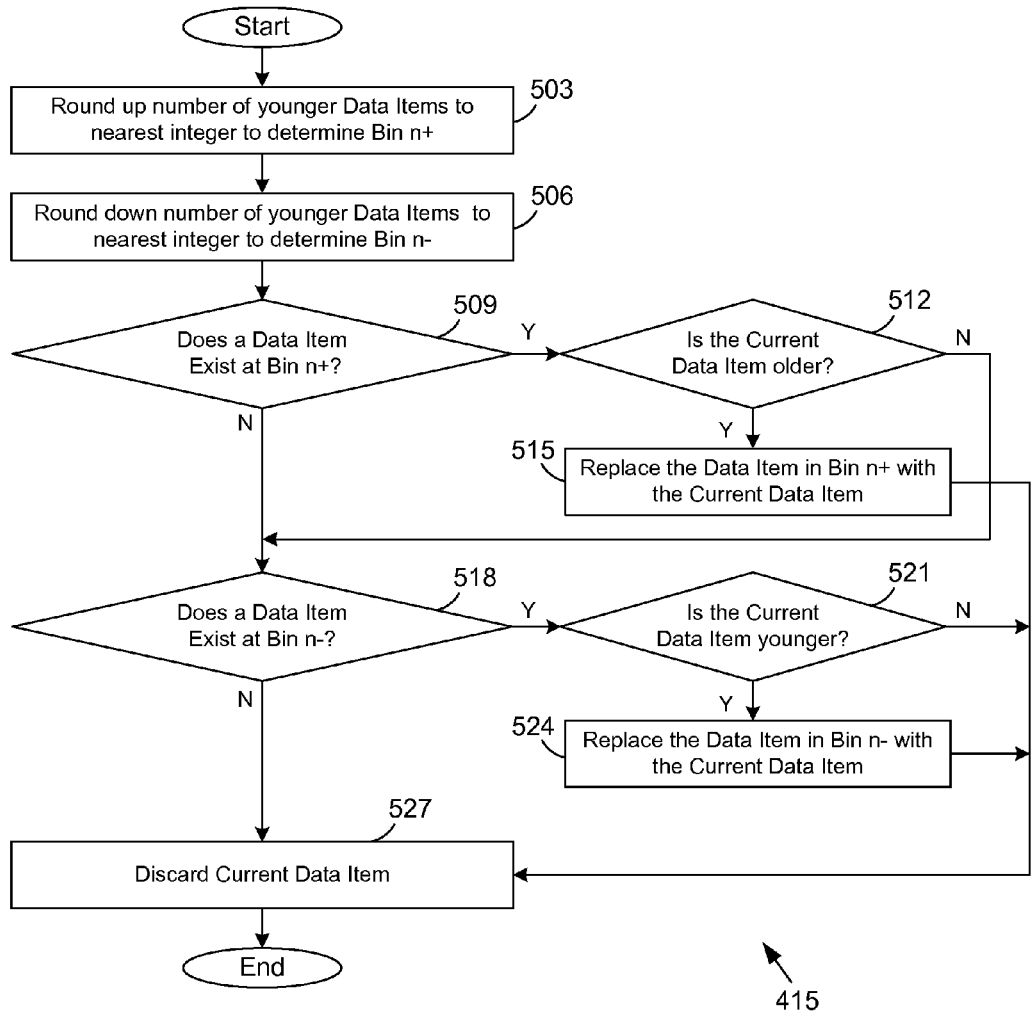
FIG. 5 is a flowchart illustrating one example of functionality implemented as portions of the data pruning application of FIG. 1 executed in a computing environment in the networked environment of FIG. 2 according to various embodiments of the present disclosure.

Referring next to FIG. 5, shown is a flowchart that provides one example of the operation of a portion of applying a binning function 106 (FIG. 1) to store data items 236 (FIG. 2) in the data pruning system 103 (FIG. 1) according to various embodiments. It is understood that the flowchart of FIG. 5 provides merely an example of the many different types of functional arrangements that may be employed to implement the operation of the portion of the data pruning system 103 as described herein. As an alternative, the flowchart of FIG. 5 may be viewed as depicting an example of steps of a method implemented in the computing device 203 (FIG. 2) according to one or more embodiments.

As previously discussed with respect to box 412 (FIG. 4), the number of data items 236 younger than a given data item 236 may be determined, for example, by applying equation 1 above. It is understood that if the number of data items 236 younger than a given data item 236 may be determined using the integral of equation 1, the resulting value may be a floating point rather than an integer. In box 415 of FIG. 4, a binning function is applied to store data items 236. Accordingly, in boxes 503 and 506, the number of data items 236 younger than a given data item 236 may be rounded up and rounded down to determine bins "n+" and "n−," respectively to be used as indexes in the binning function. In box 509, it is determined whether a data item 236 is located at bin n+. If so, in box 512, it is determined whether the data item 236 currently residing at bin n+ is older than the current data item 236. If so, in box 515, the data item 236 currently residing at bin n+ is replaced with the current data item 236. If not, the current data item 236 may be discarded via box 527.

If a data item 236 does not reside in bin n+, in box 518, it is then determined whether a data item 236 resides at bin n−. If it is determined that a data item 236 resides at bin n−, in box 521, it is determined whether the data item 236 currently residing at bin n− is younger than the current data item 236 in box 524. If so, the data item 236 currently residing at bin n− is replaced with the current data item 236. If not, the current data item 236 may be discarded via box 527. It is also understood that more variables may be used in determining whether a data item 236 is to be placed in a respective bin. For example, a file size, file name, file extension, file type, and/or any other data associated with the data item 236, may be used in determining whether to store a data item 236 in a respective bin.

Finally, in box 527, the current data item 236 is discarded. Accordingly, this process of pruning replaces data items 236 residing in bins based at least in part on the age of the data items 236. This process may produce a result of data with an average rate of decay fitting an exponential decay function:

$$\rho = \rho_0 e^{-\lambda t} \qquad (2),$$

wherein time is represented as t, the sample density may be represented as $\rho$, and the initial sample density may be represented as $\rho_0$.

It is understood for a set of data items 236 that the set may be further segmented and multiple prunings may be applied to each of the divided sets in order to obtain an average age and/or file density for each divided set. For example, all data items 236 over 10 years of age may be segmented from all data items 236 under 10 years of age. All the data items 236 over 10 years of age may be further segmented and/or pruned to determine a resulting set of data items 236 with an average age of 15 years. Similarly, all data items 236 under 10 years of age may be further segmented and/or pruned to determine a resulting set of data items 236 with an average age of 5 years. Thus, the pruning of the data items 236 over 10 years of age may be independent of the pruning of the data items 236 under 10 years of age. Accordingly, for each set applying a pruning, the resulting set obtained after the pruning may resemble an exponential decay.

Figure 6:
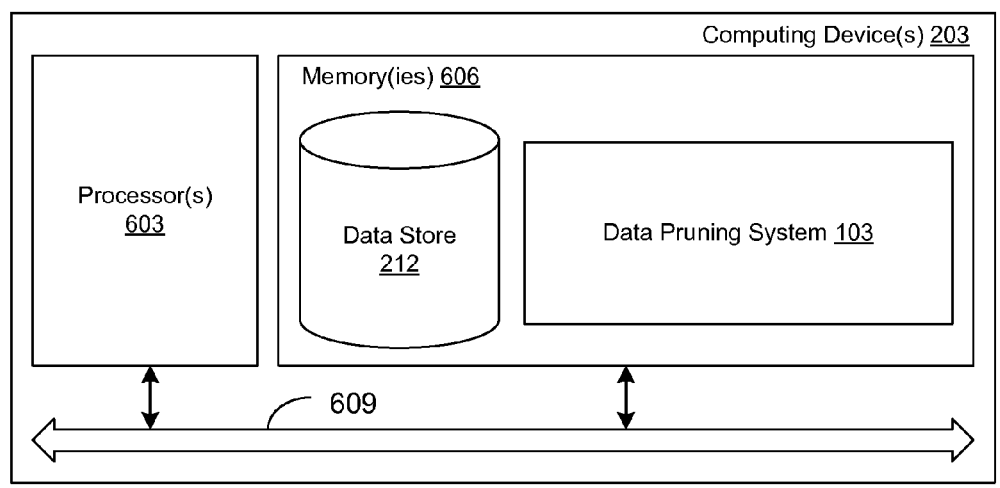
FIG. 6 is a schematic block diagram that provides one example illustration of a computing environment employed in the networked environment of FIG. 2 according to various embodiments of the present disclosure.

With reference to FIG. 6, shown is a schematic block diagram of the computing device 203 according to an embodiment of the present disclosure. The computing device 203 includes one or more computing devices 203. Each computing device 203 includes at least one processor circuit, for example, having a processor 603 and a memory 606, both of which are coupled to a local interface 609. To this end, each computing device 203 may comprise, for example, at least one server computer or like device. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 is the data pruning system 103, and potentially other applications. Also stored in the memory 606 may be a data store 212 and other data. In addition, an operating system may be stored in the memory 606 and executable by the processor 603.

It is understood that there may be other applications that are stored in the memory 606 and are executable by the processor 603 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 606 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606 is defined herein as including both volatile and nonvolatile memory and data storage components. Volatile components are those that do not retain data values upon loss of power. Nonvolatile components are those that retain data upon a loss of power. Thus, the memory 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603 may represent multiple processors 603 and/or multiple processor cores and the memory 606 may represent multiple memories 606 that operate in parallel processing circuits, respectively. In such a case, the local interface 609 may be an appropriate network that facilitates communication between any two of the multiple processors 603, between any processor 603 and any of the memories 606, or between any two of the memories 606, etc. The local interface 609 may comprise additional systems designed to coordinate this communication, including, for example, performing load balancing. The processor 603 may be of electrical or of some other available construction.

Although the data pruning system 103, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 4 and 5 show the functionality and operation of an implementation of portions of the data pruning system 103. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603 in a computer system or other system. The machine code may be converted from the source code, etc. If embodied in hardware, each block may represent a circuit or a number of interconnected circuits to implement the specified logical function(s).

Although the flowcharts of FIGS. 4 and 5 show a specific order of execution, it is understood that the order of execution may differ from that which is depicted. For example, the order of execution of two or more blocks may be scrambled relative to the order shown. Also, two or more blocks shown in succession in FIGS. 4 and 5 may be executed concurrently or with partial concurrence. Further, in some embodiments, one or more of the blocks shown in FIGS. 4 and 5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the data pruning system 103, that comprises software or code can be embodied in any non-transitory computer-readable medium for use by or in connection with an instruction execution system such as, for example, a processor 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying program code executable in at least one computing device that, when executed, causes the at least one computing device to:
   perform a prune of a plurality of files residing in a memory device such that a plot of an average age of the plurality of files retained after the prune fits an exponential decay curve and the average age of the plurality of files matches a desired average age, by:
      approximating, for a first one of the plurality of files, a count of the plurality of files having a timestamp more recent than an age of the first one of the plurality of files;
      identifying a first index and a second index associated with a potential storage location in the memory device for the first one of the plurality of files based at least in part on the count; and
      applying a binning function that causes a first portion of the plurality of files to be deleted and a second portion of the plurality of files to be retained, wherein the binning function comprises determining whether to replace a second one of the plurality of files residing in the potential storage location in the memory device associated with the first index or the second index with the first one of the plurality of files by comparing the age of the first one of the plurality of files to an age of the second one of the plurality of files residing in the potential storage location;
   transmit a notification to a second computing device comprising information associated with the plurality of files retained after the prune; and
   generate a user interface comprising the plot of the average age of the plurality of files retained after the prune.

2. The non-transitory computer-readable medium of claim 1, further comprising program code that, when executed, causes the at least one computing device to:
   generate an administrative user interface configured to receive information to be used in the prune, the information comprising at least:
      the desired average age; and
      a selection of whether to prune the files according to a time of creation or a time of modification of the plurality of files, the age and the desired average age being determined based at least in part on the selection.

3. The non-transitory computer-readable medium of claim 1, wherein the count of the plurality of files having the timestamp more recent than the age of the first one of the plurality of files is approximated by:

$$N(t) = \int_0^\tau \rho_0 e^{-\lambda t} = \frac{\rho_0}{\lambda}(1 - e^{-\lambda t}),$$

wherein t is time, $$\frac{1}{\lambda}$$

is the desired average age of the plurality of files, and an initial sample density is represented as $\rho_0$.

4. The non-transitory computer-readable medium of claim 1, wherein:
the first index associated with the potential storage location in the memory device is identified by rounding up the count; and
the second index associated with the potential storage location in the memory device is identified by rounding down the count.

5. A system, comprising:
at least one computing device comprising hardware processing circuitry and memory accessible to the at least one computing device, the memory comprising a plurality of data items; and
program instructions executable in the at least one computing device that, when executed, cause the at least one computing device to:
perform a prune of the plurality of data items residing in a memory device using a continuous pruning function such that an average age of the plurality of data items retained after the prune fits an exponential decay curve and the average age of the plurality of data items matches a desired average age, by:
estimating, for a first one of the plurality of data items, a count of the plurality of data items younger than the first one of the plurality of data items based at least in part on a comparison of a plurality of timestamps associated with individual ones of the plurality of data items;
determining at least one index associated with a potential storage location in the memory for the first one of the plurality of data items based at least in part on the count; and
applying a binning function that causes a first portion of the plurality of data items to be deleted and a second portion of the plurality of data items to be retained, wherein the binning function comprises determining whether to replace a second one of the plurality of data items residing in the storage location in the memory associated with the at least one index with the first one of the plurality of data items by comparing the age of the first one of the plurality of data items to an age of the second one of the plurality of data items residing in the storage location in the memory associated with the at least one index.

6. The system of claim 5, wherein the desired average age is provided by a user.

7. The system of claim 5, wherein performing the prune further comprises transmitting a notification to a second computing device comprising information associated with the determination whether to store the first one of the plurality of data items at the index.

8. The system of claim 5, wherein the plurality of data items further comprise a plurality of files.

9. The system of claim 5, wherein the plurality of timestamps are associated with a time of creation of the plurality of data items.

10. The system of claim 5, wherein the plurality of timestamps are associated with a time of modification of the plurality of data items.

11. The system of claim 8, wherein performing the prune further comprises forecasting, before the prune is conducted, at least a portion of the plurality of data items that will be retained after the prune.

12. The system of claim 5, wherein performing the prune further comprises generating a histogram comprising information associated with at least a portion of the plurality of data items retained after the prune.

13. The system of claim 5, wherein the at least one index comprises a first index and a second index associated with the potential storage location.

14. The system of claim 13, wherein:
the first index associated with the potential storage location in the memory is identified by rounding up the count; and
the second index associated with the potential storage location in the memory is identified by rounding down the count.

15. A method of performing a prune of a plurality of data items residing in a memory device such that an average age of the plurality of data items retained subsequent to the prune of the plurality of data items matches a desired average age specified prior to the prune, comprising:
determining, in a computing device, for a first one of the plurality of data items, a count of the plurality of data items younger than the first one of the plurality of data items having a timestamp more recent than an age of the first one of the plurality of data items;
identifying, in the computing device, an index associated with a potential memory location in the memory for the first one of the plurality of data items based at least in part on the count; and
initiating a binning process, in the computing device, that causes a first portion of the plurality of data items to be deleted and a second portion of the plurality of items to be retained comprises determining whether to replace a second one of the plurality of data items residing in the memory location associated with the index with the first one of the plurality of data items by comparing the age of the first one of the plurality of data items to an age of the second one of the plurality of data items currently residing in the memory location.

16. The method of claim 15, wherein the desired average age is predefined.

17. The method of claim 15, further comprising forecasting, in the computing device, a result of the determination whether to store the first one of the plurality of data items at the index.

18. The method of claim 15, further comprising transmitting, in the computing device, a notification comprising information associated with the determination whether to store the first one of the plurality of data items at the index.

19. The method of claim 15, further comprising generating, in the computing device, at least one histogram comprising information associated with the determination whether to store the first one of the plurality of data items at the index.

20. The method of claim 15, wherein the timestamp associated with the first one of the plurality of data items corresponds to a time of creation of the first one of the plurality of data items.

21. The method of claim 15, wherein the timestamp associated with the first one of the plurality of data items corresponds to a time of modification of the first one of the plurality of data items.

22. The method of claim 15, wherein the binning process is initiated by at least one of: a file save, a scheduled time of initiation, or an event performed by a file system.

23. The method of claim 15, wherein:
- the index is a first index associated with the potential memory location;
- the first index associated with the potential memory location in the memory is identified by rounding up the count; and
- a second index associated with the potential memory location in the memory is identified by rounding down the count.

* * * * *